United States Patent [19]
Moreland et al.

[11] Patent Number: 5,896,556
[45] Date of Patent: Apr. 20, 1999

[54] APPARATUS AND METHOD FOR PROVIDING A TELEPHONE CONNECTION OVER A COAX CABLE DISTRIBUTION SYSTEM

[75] Inventors: Larry K. Moreland, Lomax; Charles L. Brown, Galesburg, both of Ill.

[73] Assignee: Conifer Corporation, Burlington, Iowa

[21] Appl. No.: 08/876,193

[22] Filed: Jun. 13, 1997

[51] Int. Cl.$^6$ ................................................ H04H 1/00
[52] U.S. Cl. ................................................ 455/5.1; 455/6.2
[58] Field of Search .................. 348/6–8, 10, 12–14, 348/16–17; 455/3.1, 5.1, 6.1, 6.2, 6.3; 379/90.01; 340/825.24, 825.25, 825.35; 370/493, 486, 487, 488

[56] References Cited

U.S. PATENT DOCUMENTS

| | | |
|---|---|---|
| 3,949,172 | 4/1976 | Brown et al. . |
| 4,058,678 | 11/1977 | Dunn et al. . |
| 4,475,193 | 10/1984 | Brown . |
| 4,479,033 | 10/1984 | Brown et al. . |
| 4,495,386 | 1/1985 | Brown et al. . |
| 4,514,594 | 4/1985 | Brown et al. . |
| 4,523,307 | 6/1985 | Brown et al. . |
| 5,027,426 | 6/1991 | Chiocca et al. ........................... 455/5 |
| 5,610,916 | 3/1997 | Kostreski et al. ..................... 370/487 |
| 5,615,246 | 3/1997 | Beveridge ............................. 379/56 |
| 5,719,872 | 2/1998 | Dubberly et al. ..................... 370/487 |

*Primary Examiner*—Andrew I. Faile
*Assistant Examiner*—Uyen Le
*Attorney, Agent, or Firm*—Zarley, McKee, Thomte, Voorhees & Seas

[57] ABSTRACT

An apparatus of the present invention is adapted to provide a telephone line connection over a coax cable distribution system. In a home having a plurality of set-top television boxes which each require a connection to a telephone line, the present invention allows a single telephone line connection to be provided to the plurality of set-top boxes via the coax cable distribution system. The invention uses a first interface device connected to a telephone line to modulate telephone signals and transmit them over the coax cable distribution system. The device also includes a demodulator to demodulate signals received over the coax cable distribution system to be sent over the telephone line. The invention includes a second interface device at each set-top box which also includes a modulator and demodulator to transmit and receive telephone signals over the coax cable distribution system.

15 Claims, 5 Drawing Sheets

APPARATUS AND METHOD FOR PROVIDING A TELEPHONE CONNECTION OVER A COAX CABLE DISTRIBUTION SYSTEM

BACKGROUND OF THE INVENTION

1. Field of the Invention

The present invention relates to systems for providing a telephone interface to a television system. More particularly, though not exclusively, the present invention relates to an apparatus and method for providing a transparent remote connection to a telephone/audio modem located on a coaxial cable distribution system.

2. Problems in the Art

Various systems exist in the prior art for providing television signals to a TV including off air antennas, direct broadcast satellites (DBS), conventional cable services, or MMDS (Multi-channel Multi Point Distribution System) systems. U.S. Pat. No. 5,394,559 issued Feb. 28, 1995, entitled MMDS/ITFS Bi-Directional Over the Air Transmission System and Method Therefore, which is assigned to the assignee of the present invention, describes an example of such a system and is incorporated by reference herein.

With any of these systems, there is a need to provide feedback from the consumer to the program delivery source. This feedback is typically used for pay per view services, but could also include purchasing information, computer data, etc. A typical prior art system for providing feedback from a consumer to the program delivery source includes the use of a set-top box which provides for a standard telephone line hookup for sending data back to the billing computer. This system can easily be installed by a customer to access pay per view programming, for example. However, many homes have multiple televisions which require multiple set-top boxes with a phone line connection at each set-top box. Connecting a telephone line to every set-top box is costly since a separate phone jack is required at each set-top box. FIG. 1 is a block diagram of such a prior art set up. As shown, a multi-set splitter is used to provide signals to a plurality of set-top boxes. Each set-top box is connected to a television. Each set-top box is also connected to a separate telephone jack (designated as "TELCO").

A prior art system exists for providing a telephone line connection to a plurality of extension phones without having a standard telephone jack located at each extension phone. This prior art system uses a device which communicates over the AC power wires found in a home. U.S. Pat. No. 4,495,386 issued on Jan. 22, 1985 entitled Telephone Extension System Utilizing Power Line Carrier Signals describes such a prior art system, and is incorporated by reference herein. FIG. 2 is a block diagram of a system using the AC power wiring to provide telephone line connections to a plurality of extension phones. As shown, a master linking circuit is connected to a standard power outlet which is connected to the AC power wiring of the home. The master linking circuit is also connected to a standard telephone jack. Elsewhere in the home, extension phones can be connected to extension linking circuits which are connected to other standard power outlets. The linking circuits use the AC power wiring to transmit and receive phone signals between the extension phones and the telephone jack. As is described in the above referenced patent, the interface devices allow telephone signals to be transmitted from the phone jack to each extension phone. A system which uses AC wiring to transmit phone signals has various disadvantages. For example, the equipment required for such a system is costly.

Also, the 100 KHz and 200 kHz signals used for such prior art devices are susceptible to interference. Sources of interference include: microwave ovens, motors, remote control lighting, power line intercom systems, and remote speakers. In addition some 220 VAC services have a problem with AC power line signaling between the two legs of the 220 VAC power. The AC power wiring is not conducive to the radio frequencies due to lack of shielding from ingress and prevention of egress and the inability of the power wiring to pass the RF signals.

It can therefore be seen that there is a need for a system which provides a telephone line connection to a number of set-top boxes without the need of multiple telephone line jacks and without using AC wiring.

FEATURES OF THE INVENTION

A general feature of the present invention is the provision of a method and apparatus for providing a telephone line connection to a plurality of devices which overcomes problems found in the prior art.

A further feature of the present invention is the provision of a method and apparatus for providing a telephone line connection to a plurality of devices using a coax cable distribution system.

Further features, objects and advantages of the present invention include:

A method and apparatus for providing a telephone line connection to a plurality of set-top television boxes used by DBS, standard cable, MMDS, or other television systems.

A method and apparatus for providing a telephone line connection for a plurality of devices which includes a subscriber line interface which can determine the telephone line status.

A method and apparatus for providing a telephone line connection to a plurality of devices which includes a modulator and demodulator for communication between a telephone line and a remote set-top via a coax cable system.

A method and apparatus for providing a telephone line connection to a plurality of devices which works effectively and economically.

These as well as other features, objects and advantages of the present invention will become apparent from the following specification and claims.

SUMMARY OF THE INVENTION

The apparatus and method of the present invention is used with a coax cable distribution system for providing a telephone line connection to a device over the coax cable distribution system. The invention is comprised of a first interface device connected to the phone line and to the coax cable distribution system and a second interface device connected to the coax cable distribution system and to a device requiring a telephone connection. The coax cable distribution system is used to transmit and receive the telephone line signals. The invention is preferably used with a plurality of set-top television boxes, each requiring a separate phone line connection. The present invention allows a single telephone line to be connected to the various set-top television boxes via the coax cable distribution system.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalencies which may be included within the spirit and scope of the invention.

Figure 3:
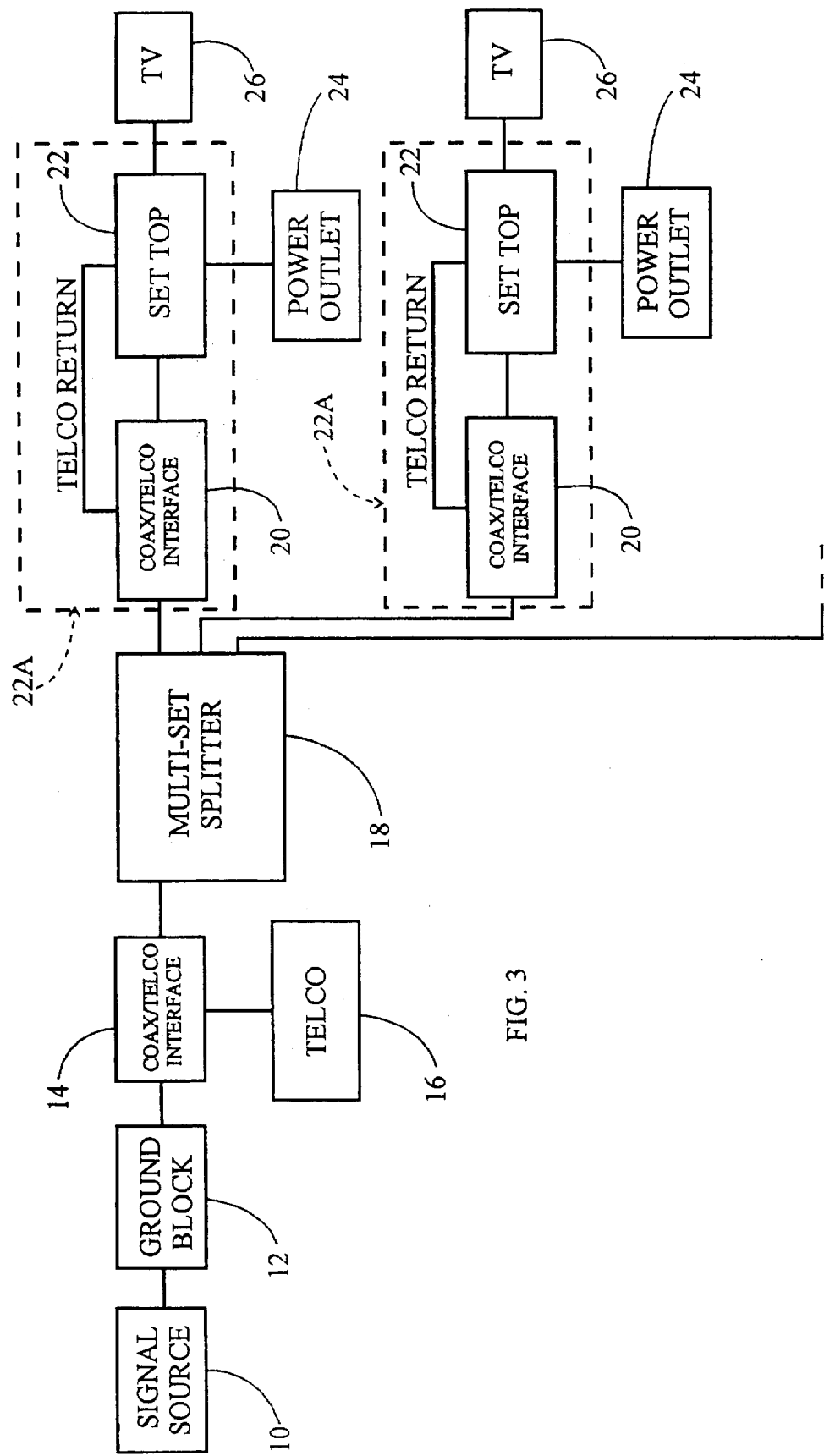
FIG. 3 is a block diagram of the present invention.

FIG. 3 is a block diagram of the present invention. As shown in FIG. 3, a signal source 10 provides a source of television signals. The signal source 10 could be comprised of an MMDS antenna, a DBS antenna, or a cable drop, for example. The signal source 10 is connected to a ground block 12 which in turn is connected to a coax/TELCO interface 14. The coax/TELCO interface 14 is comprised of circuitry which is connected to a standard telephone jack 16. The coax/TELCO interface 14 is described in more detail below. The interface 14 is also connected via a coax cable to a multi-set splitter 18 for providing the television signals to a plurality of televisions which are perhaps located in various rooms of a house. As described in more detail below, the signals transmitted between the interface 14 and splitter 18 comprise the television signals from the signal source 10 as well as telephone information.

The multi-set splitter 18 is ultimately connected to a plurality of television set ups. The number of television set ups that can be connected to the multi-set splitter 18 depends on the capabilities of the splitter 18. In FIG. 3, two television set ups are shown with the dashed line representing that others could be used as well. Also, only one television set up could be used. At each television set up, the multi-set splitter 18 is connected to a coax/TELCO interface device 20. The coax/TELCO interface device 20 is described in detail below. The coax/TELCO interface device 20 includes circuitry which is connected to a set-top box 22 using two primary connections. The first connection between the interface device 20 and set-top box 22 transmits the television signals. The second connection between the interface 20 and set-top box 22 is the TELCO return connection and contains the telephone information signals. Alternatively, the circuitry of the interface device 20 could be included with or enclosed within the set-top box 22. FIG. 3 shows this alternative option as set-top box 22A, shown by a dashed box around the interface device 20 and the set-top box 22. With the set-top box 22A, the user would not have to connect a TELCO return line since the TELCO return would be internal to the set-top box 22A. Each set-top box 22 is connected to a standard power outlet 24 and to a television set 26 or VCR (not shown).

Figure 1:
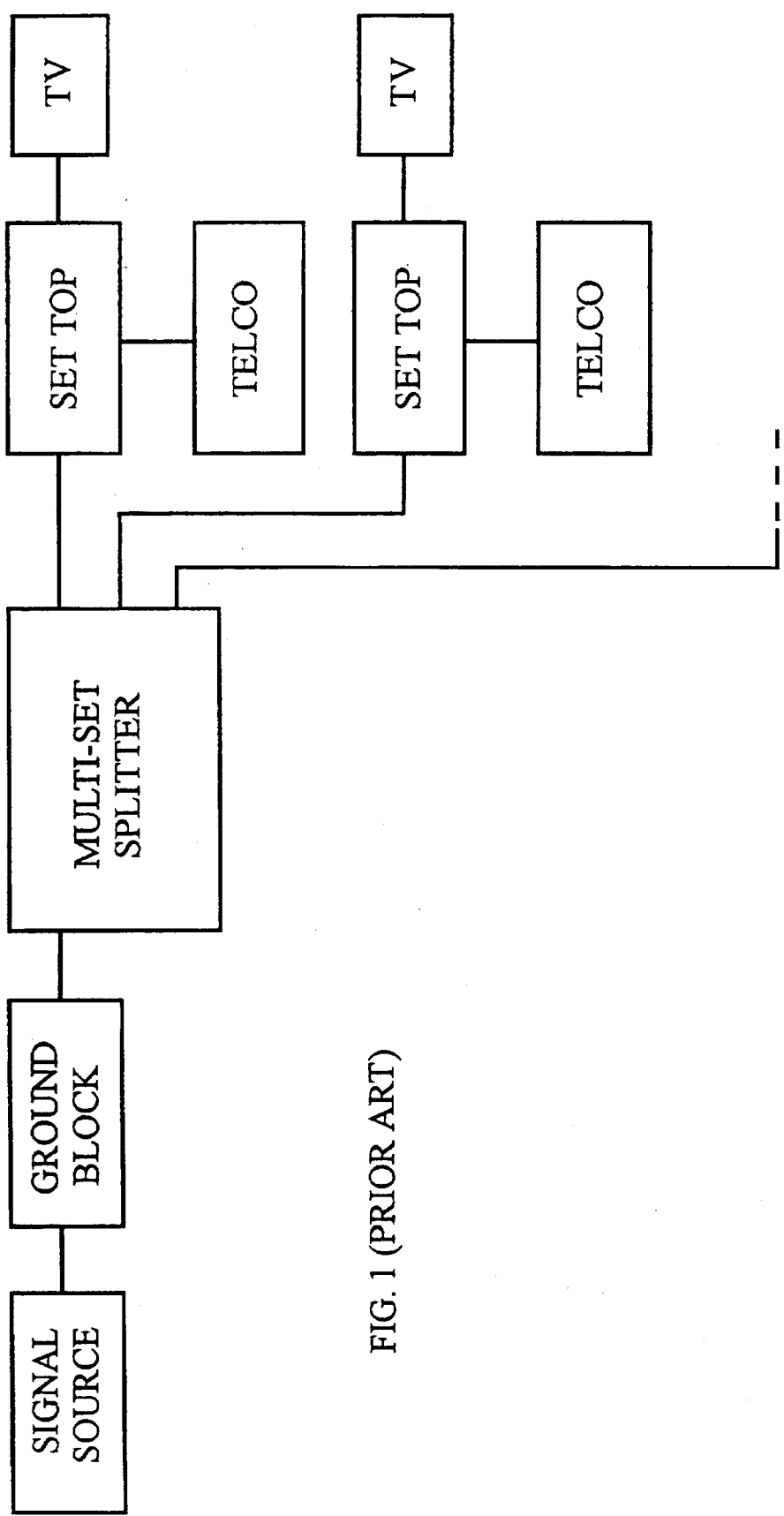
FIG. 1 is a block diagram of a prior art system for providing multiple telephone line connections to set-top television boxes.
Figure 2:
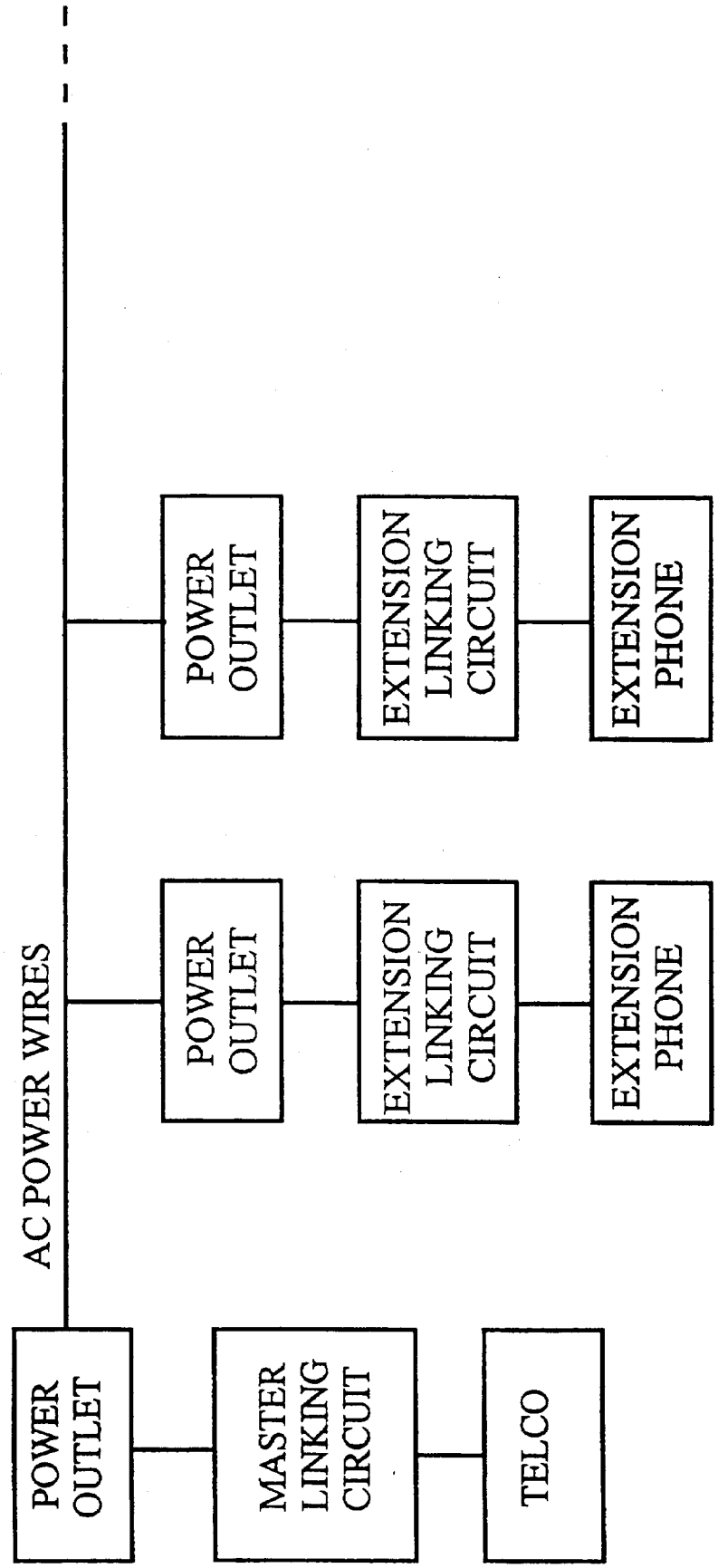
FIG. 2 is a block diagram of a prior art system using the AC power lines to provide telephone connections to a plurality of extension phones.

As was shown in FIG. 1, the set-top box requires a television signal and a connection to a telephone jack in order to use features such as pay per view, for example. With the present invention shown in FIG. 3, the set-top boxes 22 each receive television signals from its corresponding coax/TELCO interface 20 as well as the necessary telephone signals through the same interface 20. The main difference between the invention of FIG. 3 and the prior art shown in FIG. 1 is that rather than connecting each set-top box 22 directly to a phone jack, the necessary phone signals are transmitted and received through the coax distribution system in the home via the coax/TELCO interfaces 14 and 20.

Figure 4:
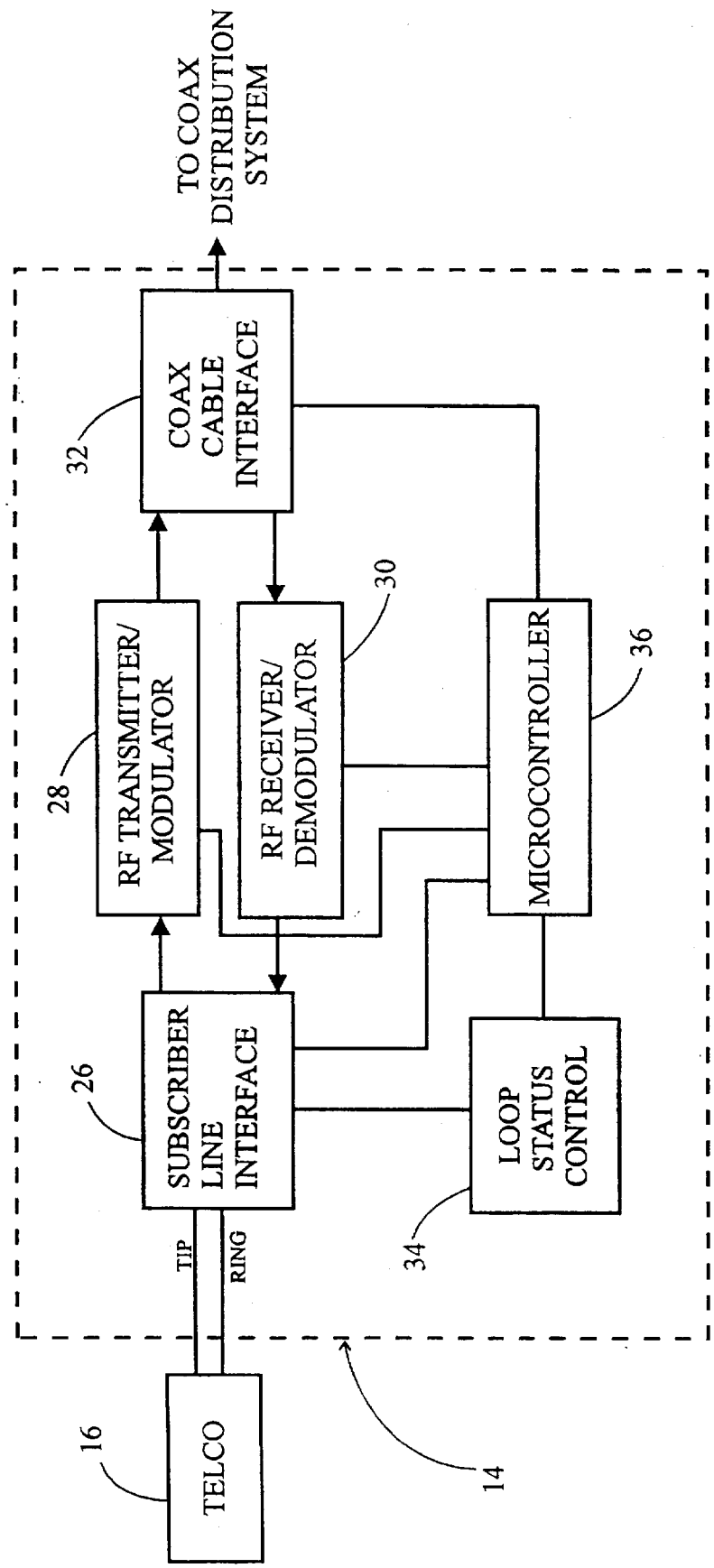
FIG. 4 is a block diagram of the coax/telephone line interface shown in FIG. 3.

FIG. 4 is a block diagram of the coax/TELCO interface device 14 shown in FIG. 3. As shown, the interface device 14 is connected to a telephone jack 16. This requires two connections, tip and ring, which are found with standard telephone connections. The tip and ring lines are connected to a subscriber line interface circuit 26. The subscriber line interface circuit 26 is connected to an RF transmitter/modulator 28 and an RF receiver/demodulator 30. The present invention preferably operates at frequencies of 10.7 Mhz and 4.5 Mhz, although other frequencies could be used. The modulator 28 and demodulator 30 are each connected to a coax cable interface 32 which is then connected to the coax distribution system external to the interface device 14. A loop status control 34 is connected to the subscriber line interface 26 and is used to determine the telephone line status such as off hook, busy, carrier detect, ring indicator, dual tone multi frequency dialing signals, and audio/data.

A microcontroller 36 makes a connection with the subscriber line interface circuit 26, the RF transmitter/modulator 28, the RF receiver/demodulator 30, and the loop status control 34. The microcontroller is used to coordinate the set-top and coaxial cable signals. The microcontroller may optionally be implemented in programmable or descrete logic in the loop status control.

When the interface device 14 is receiving signals from the telephone jack 16, the subscriber line interface circuit 26 sends the signals to the radio frequency transmitter/modulator 28 to modulate the signals for communication to the remote set-top box 22 via the coax cable distribution system. Similarly, when receiving information from the set-top box to be transmitted to the telephone line 16, the signal from the set-top box 22 via the coax cable distribution system is demodulated by the RF receiver/demodulator 30 and sent to the subscriber line interface 26 and finally to the telephone line via the telephone jack 16.

Figure 5:
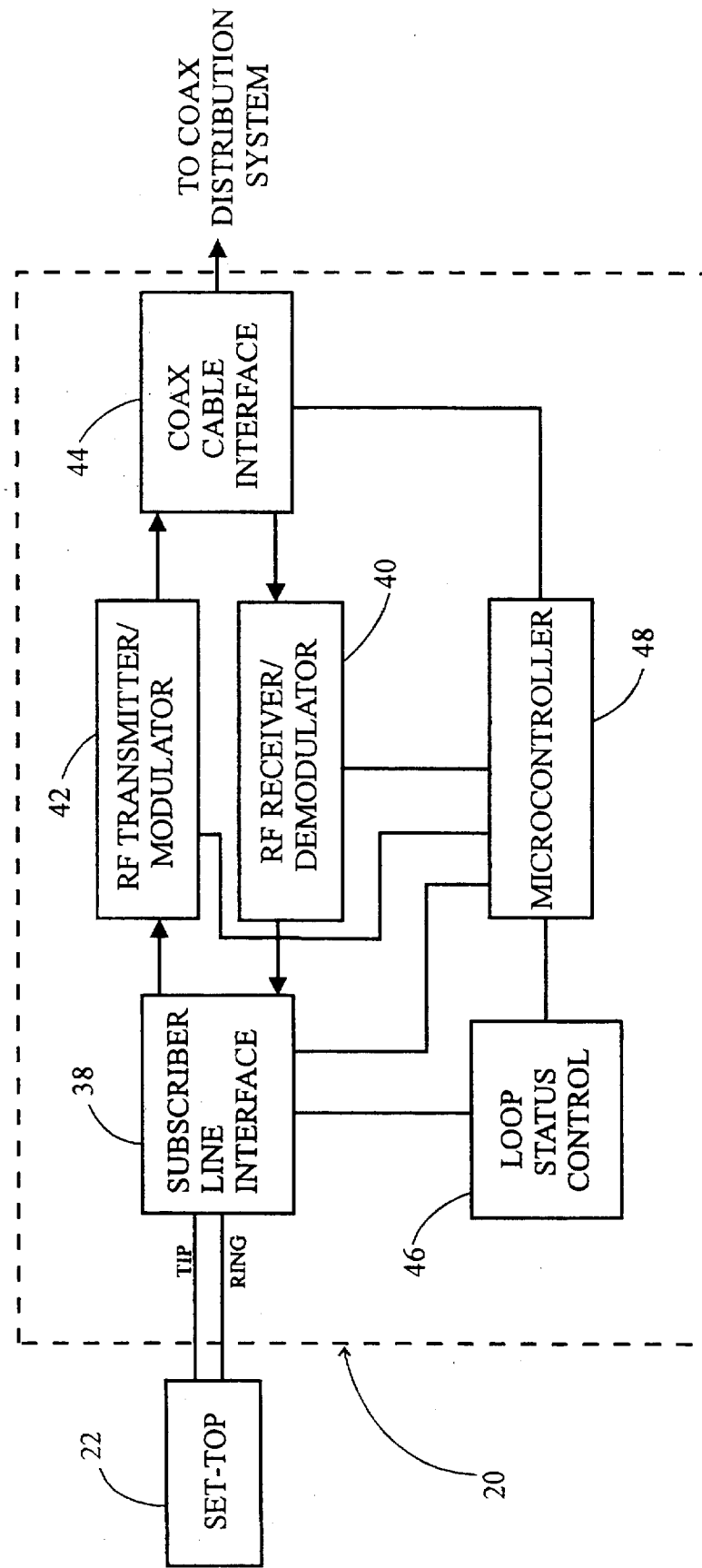
FIG. 5 is a block diagram of the coax/set-top interface shown in FIG. 3.

FIG. 5 is a block diagram of the remote RF coax cable set-top interface device 20 shown in FIG. 3. The interface device 20 works in a manner similar to the interface device 14 shown in FIG. 4. The interface device 20 is connected to the set-top box 22 by a tip and ring phone connection. The tip and ring connections are connected to a subscriber line interface circuit 38 which is similar to the interface circuit 26 shown in FIG. 4. The interface circuit 38 is connected to the RF receiver/demodulator 40 and the RF transmitter/modulator 42. The demodulator 40 and modulator 42 are each connected to the coax cable interface 44 which is similar to the interface 32 shown in FIG. 4. A loop status control 46, similar to the loop status control 34 of FIG. 4, is also connected to the subscriber line interface circuit 38. Finally, a microcontroller 48, similar to the microcontroller 36 in FIG. 4, is connected to the interface circuit 38, the demodulator 40, the modulator 42, and the loop status control 46.

During operation, when the set-top box 22 is transmitting information to the telephone jack 16, the information will be passed from the interface circuit 38 to the RF transmitter/modulator 42 (FIG. 5) where it is modulated for communication across the coax cable distribution system. The interface device 14 will receive the modulated signal where the RF receiver/demodulator 30 (FIG. 4) will demodulate the signal and send it to the telephone jack 16.

When information is being received from the telephone jack 16, the information is modulated by the RF transmitter/modulator 28 (FIG. 4) and provided to the coax cable distribution system. The modulated information from the interface device 14 will be received by the RF receiver/ demodulator 40 (FIG. 5) where it is demodulated to an audio signal and ultimately provided to the set-top box 22.

In this way, when information is transmitted or received by the set-top box, it is transmitted or received as if it were connected directly to a telephone line like that shown in FIG. 1 except that only one telephone connection is required throughout the entire system. In this way, the system can provide a transparent remote connection to a telephone/ audio modem located anywhere on the coaxial cable distribution system. The same coaxial cable distribution system also provides the distribution and/or control of television signals from an off air antenna, direct broadcast satellite equipment, conventional cable, MMDS systems, etc. Therefore, the remote telephone interface system will coexist with the control signals required by the RF video sources.

The operation of the present invention has been described in its prefered form, that is, use with a plurality of set top boxes. However, other alternatives are possible. For example, the television signals transmitted over the coax distribution line system could be digital in nature and provide video data to the subsciber's home for enteratinment or data communication. The device connected to the coax/ telco interface 20 could also be an RF receive modem with telco return. Such a device could be used for computer use on the internet, a remote terminal, or a Wide Area Network. In addition, any other device requiring a phone line connection could be connected to a coax/telco interface 20 including, but not limited to a telephone, cable modem, data modem, fax machine, answering machine, etc.

The operation of the present invention has been described as being used in a home having multiple set-top boxes 22. The present invention could also be used in another way. In an area such as an appartment building, apartment complex, neighborhood, hotel, etc., many dwellings may each have a set-top box which must be connected to a phone line. Rather than having each dwelling provide a phone line, the entire apartemnt building could have a single dedicated phone line connected to an interface device 14 so that everyone having a set-top box 22 and an interface device 20, or a set-top box 22A, could send data or other information via the dedicated phone line without having to use their own personal phone line. In this situation, a user may not even know that they are using a remote phone line to send data, they only know that when they place orders for pay-per-view movies, etc. through their set-top box, their order is taken.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method of providing a telephone line connection over a coax cable distribution system to a set-top television box in an MMDS or DBS system comprising:
   providing a first interface device;
   connecting the first interface device to a telephone line;
   connecting the first interface device to the coax distribution system;
   providing a second interface device;
   connecting the second interface device to the coax distribution system;
   connecting the second interface device to the set-top television box;
   determining the status of the telephone line;
   using the first interface device to modulate signals from the telephone line on an RF carrier and to transmit the modulated signals over the coax cable distribution system;
   using the second interface device to demodulate the modulated signals transmitted over the coax cable distribution system; and
   providing the demodulated signals to the set-top television box.

2. The method of claim 1 further comprising the steps of:
   using the second interface device to modulate signals from the set-top television box and to transmit the modulated signals from the set-top television box over the coax cable distribution system;
   using the first interface device to demodulate the modulated signals from the set-top television box; and
   providing the demodulated signals from the set-top television box to the telephone line.

3. The method of claim 1 further comprising the steps of:
   providing a second set-top television box;
   providing a third interface device;
   connecting the third interface device to the coax distribution system;
   connecting the third interface device to the second set-top television box;
   using the third interface device to demodulate the modulated signals transmitted over the coax cable distribution system; and
   providing the demodulated signals to the second set-top television box.

4. The method of claim 1 wherein the set-top television box is an MMDS receiver.

5. The method of claim 1 wherein the set-top television box is a DBS receiver.

6. The method of claim 1 wherein the set-top television box is a satellite television receiver.

7. The method of claim 1 wherein the set-top television box is a cable television converter box.

8. An apparatus for providing a telephone line connection over a coax cable distribution system to a set-top television box comprising:
   a first interface device operatively connected to a telephone line for providing an interface between the telephone line and the coax cable distribution system, the first interface device having a subscriber line interface connected to the telephone line and a loop status control operatively connected to the subscriber line interface;
   a modulator for RF modulating signals from the phone line to be transmitted over the coax cable distribution system;
   a second interface device operatively connected to the set-top television box for providing an interface between the set-top box and the coax cable distribution system;
   a demodulator for demodulating the RF modulated signals transmitted over the coax cable distribution system; and
   wherein the coax distribution system provides the set-top television box with both television signals and telephone signals.

9. The apparatus of claim 8 further comprising:
   a second set-top television box; and
   a third interface device operatively connected to the second set-top television box for providing an interface between the second set-top box and the coax cable distribution system.

10. The apparatus of claim 8, wherein the second interface device includes a second modulator for modulating signals from the set-top television box for transmission over the coax cable distribution system, and wherein the first interface device includes a second demodulator for demodulating the modulated signals from the set-top television box.

11. The apparatus of claim 8 wherein the set-top television box is comprised of an MMDS receiver.

12. The apparatus of claim 8 wherein the set-top television box is comprised of a DBS receiver.

13. The apparatus of claim 8 wherein the set-top television box is comprised of a satellite television receiver.

14. The apparatus of claim 8 wherein the set-top television box is comprised of a cable television converter box.

15. An apparatus for providing a telephone line connection over an MMDS or DBS coax cable distribution system comprising:

a first interface device operatively connected to a telephone line for providing an interface between the telephone line and the coax cable distribution system;

an RF modulator for modulating signals from the telephone line onto an RF carrier;

a loop status control device operatively connected to the first interface for determining the status of the telephone line; and a second interface device, including a demodulator for demodulating the modulated signals, operatively connected to the coax cable distribution system for providing an interface between the coax cable distribution system and a device requiring a telephone connection, wherein the first and second interfaces enable telephone signals to be transmitted over the coax cable distribution system between the device requiring a telephone connection and the telephone line.

* * * * *